United States Patent
Stemmler

(10) Patent No.: US 12,264,380 B2
(45) Date of Patent: Apr. 1, 2025

(54) METHOD FOR RECOVERING PRECIOUS METAL

(71) Applicant: Heraeus Deutschland GmbH & Co. KG, Hanau (DE)

(72) Inventor: Marco Stemmler, Santa Fe Springs, CA (US)

(73) Assignee: HERAEUS DEUTSCHLAND GMBH & CO. KG, Hanau (DE)

( * ) Notice: Subject to any disclaimer, the term of this patent is extended or adjusted under 35 U.S.C. 154(b) by 358 days.

(21) Appl. No.: 17/756,015

(22) PCT Filed: Sep. 30, 2020

(86) PCT No.: PCT/EP2020/077319
§ 371 (c)(1),
(2) Date: May 13, 2022

(87) PCT Pub. No.: WO2021/099021
PCT Pub. Date: May 27, 2021

(65) Prior Publication Data
US 2022/0389537 A1 Dec. 8, 2022

(30) Foreign Application Priority Data

Nov. 18, 2019 (EP) ..................................... 19209661

(51) Int. Cl.
*C22B 11/00* (2006.01)
*C22B 3/42* (2006.01)

(52) U.S. Cl.
CPC .............. *C22B 11/042* (2013.01); *C22B 3/42* (2013.01)

(58) Field of Classification Search
CPC ......... C22B 11/042; C22B 11/06; C22B 3/42; C22B 3/46; Y02P 10/20
See application file for complete search history.

(56) References Cited

U.S. PATENT DOCUMENTS 4,229,270 A * 10/1980 Subramanian ........ C01B 19/001
205/569
2017/0198370 A1* 7/2017 Virtanen ................... C22B 3/46

FOREIGN PATENT DOCUMENTS

| CN | 105274337 A |   | 1/2016  |
|----|-------------|---|---------|
| CN | 106518605 A | * | 3/2017  |
| DE | 2914439 A1  |   | 10/1979 |
| GB | 1337739     | * | 11/1973 |
| GB | 1337739 A   |   | 11/1973 |
| WO | 0183835 A2  |   | 11/2001 |

OTHER PUBLICATIONS

Current technologies for recovery of metals from industrial wastes: An overview (Year: 2021).*
Collins Saguru, et al., "A review of recent studies into hydrometallurgical methods for recovering PGMs from used catalytic converters" Hydrometallurgy., NL, vol. 182, Dec. 1, 2018 (Dec. 1, 2018), pp. 44-56; ISSN: 0304-386X, XP055691710; chapter 4.2.

* cited by examiner

*Primary Examiner* — Jenny R Wu
(74) *Attorney, Agent, or Firm* — Blank Rome LLP

(57) ABSTRACT

A method for recovering precious metal from an acidic aqueous solution containing dissolved precious metal and free chlorine, comprising the following successive steps:
(1) combining a salt of a non-precious metal present in a low oxidation state as a solid or as an aqueous solution with the acidic aqueous solution to consume the free chlorine and form an acidic aqueous mixture, and
(2) adding non-precious metal to the acidic aqueous mixture formed in step (1) to precipitate elementary precious metal.

17 Claims, No Drawings

METHOD FOR RECOVERING PRECIOUS METAL

The invention relates to a method for recovering precious metal from an acidic aqueous solution containing dissolved precious metal and free chlorine.

The term "dissolved precious metal" used herein means precious metal in aqueous solution, in the form of one or more precious metal compounds present in dissolved form, in which the precious metal has an oxidation state>0.

Wet chemical precious metal recycling or wet chemical precious metal refining usually includes precipitation of poorly soluble precious metal chlorocomplex salts. In the process, acidic and free-chlorine-containing mother liquors are frequently obtained with a precious metal fraction which is only small but still worth recovering. The substantial recovery of this precious metal fraction in solution is realized reductively, for example by adding iron powder or zinc powder. However, free chlorine must be removed beforehand, in particular in order to avoid the formation of an explosive mixture of hydrogen and chlorine gas, for example in an exhaust air section. An explosive mixture of hydrogen and chlorine gas can be formed when the free chlorine unintentionally comes into contact with hydrogen, which is produced by the unavoidable side reaction of the non-precious iron or tin with the acidic mother liquor. It has hitherto been common practice to expel the free chlorine from such mother liquors before addition of the iron or zinc powder by aerating the mother liquor with compressed air over a period of typically 4 to 48 hours.

CN106518605A discloses the extensive removal of free chlorine from an acidic wastewater formed in another chemical context (chlorobenzene production) by addition of iron(II) chloride, forming iron(III) chloride.

The invention relates to a method for recovering precious metal from an acidic aqueous solution containing dissolved precious metal and free chlorine, comprising the following successive steps:
(1) combining a salt of a non-precious metal present in a low oxidation state as a solid or as an aqueous solution with the acidic aqueous solution to consume the free chlorine and form an acidic aqueous mixture, and
(2) adding non-precious metal to the acidic aqueous mixture formed in step (1) to precipitate elementary precious metal.

From another standpoint, the invention can be considered to be a method for preventing the formation of an explosive mixture of hydrogen and chlorine gas during the recovery of precious metal from an acidic aqueous solution containing dissolved precious metal and free chlorine, comprising the following successive steps:
(1) combining a salt of a non-precious metal present in a low oxidation state as a solid or as an aqueous solution with the acidic aqueous solution to consume the free chlorine and form an acidic aqueous mixture, and
(2) adding non-precious metal to the acidic aqueous mixture formed in step (1) to precipitate elementary precious metal.

From yet another standpoint, the invention can be considered to be a method for removing free chlorine during the recovery of precious metal from an acidic aqueous solution containing dissolved precious metal and free chlorine, comprising the following successive steps:
(1) combining a salt of a non-precious metal present in a low oxidation state as a solid or as an aqueous solution with the acidic aqueous solution to consume the free chlorine and form an acidic aqueous mixture, and
(2) adding non-precious metal to the acidic aqueous mixture formed in step (1) to precipitate elementary precious metal.

Steps (1) and (2) are successive steps, i.e., steps following each other directly without intermediate steps or steps following each other with one or more intermediate steps.

In step (1) of the method according to the invention, a salt of a non-precious metal present in a low oxidation state (hereinafter also referred to as "salt" for short) as a solid or as an aqueous solution is combined with an acidic aqueous solution containing dissolved precious metal and free chlorine (hereinafter also referred to as "acidic aqueous solution" for short). Several different such salts can also be used in combination. Preferably, salt or the aqueous salt solution is added to the acidic aqueous solution. Alternatively, but less preferably, the acidic aqueous solution may be added to the salt or aqueous salt solution.

The acidic aqueous solution may in particular be a mother liquor originating from wet chemical precious metal recycling or wet chemical precious metal refining. Such mother liquors are produced, for example, after precipitation of precious metal in the form of poorly soluble chlorocomplex salts from aqueous solutions.

The acidic aqueous solution, in particular in the form of said mother liquor, is characterized by (i) a fraction of dissolved precious metal for example in the range of 100 to 500 mg/l, (ii) a pH for example in the range of −0.8 to +1 and (iii) a content of free chlorine (dissolved $Cl_2$) for example in the range of 0.1 to 1 g/l or for example in the range of 1000 to 10,000 ppm by weight. The dissolved precious metal is one or more precious metals selected from the group consisting of gold, platinum, palladium, rhodium, iridium, osmium and ruthenium. Dissolved silver can also be present as a sole dissolved precious metal or in combination with one or more of the previously mentioned dissolved precious metals, but only at very low pH of the acidic aqueous solution in the range of −0.8 to less than −0.5. The low or very low pH of the acidic aqueous solution is substantially or even exclusively caused by the presence of hydrochloric acid. In addition to hydrochloric acid, however, other inorganic acids such as, in particular, nitric acid may also be present in the acidic aqueous solution.

The salt of a non-precious metal present in a low oxidation state, used as a solid or as an aqueous solution in step (1) of the method according to the invention, is water-soluble. The water-solubility is generally, for example, more than 100 g/l at 20° C., generally several hundred grams per liter of water at 20° C. The expression "non-precious metal present in a low oxidation state" used herein means a non-precious metal which can assume different positive oxidation states and is present in a positive oxidation state from which it can be changed to a higher oxidation state by reaction with chlorine. Examples include the non-precious metals iron and tin, each in the oxidation state +2; iron(II) can be converted into iron(III), tin(II) into tin(IV), by reaction with chlorine.

Specific examples of salts usable as a solid or as an aqueous solution in step (1) of the method according to the invention include tin(II) salts, but in particular iron(II) salts. For example, tin(II) salt, iron(II) salt, or tin(II) salt in combination with iron(II) salt can be used. Examples of tin(II) salts include tin(II) chloride and tin(II) sulfate. Examples of iron(II) salts include iron(II) chloride, iron(II) sulfate and iron(II) nitrate; iron(II) chloride and iron(II) sulfate are preferred.

The salt is typically used in a stoichiometric or superstoichiometric amount, in relation to free chlorine to be consumed. If a superstoichiometric amount is used, no more than ten times the stoichiometric amount is generally used. Preference is given to working stoichiometrically. Explained using the example of the iron(II) chloride preferably used, this means that 2 moles of iron(II) chloride are typically used per mole of free chlorine ($Cl_2$) because the reaction in this example is as follows: $2FeCl_2 + \rightarrow 2FeCl_3$.

The salt can be used as a solid or as an aqueous solution. When used as an aqueous solution, a rather concentrated solution is preferably used, for example in a concentration range of 10 to 30% by weight. This procedure offers handling advantages and avoids the handling of an unnecessarily high volume of acidic aqueous mixture formed after completion of step (1).

After the addition of the salt to the acidic aqueous solution or vice versa and good mixing, the mixture is generally allowed 5 to 15 min time at 20 to 60° C. for the consumption of the free chlorine and formation of the acidic aqueous mixture. It can be mixed continuously, for example by stirring. Reaction monitoring can be carried out using customary methods, for example by means of the iodine starch test known to the person skilled in the art or potentiometrically. In the latter case, for example, iron(II) salt can be added until a potential in the range of 470 to 550 mV is reached. After the reaction has ended, the content of free chlorine in the acidic aqueous mixture formed is usually <50 ppm by weight; in other words, the original acidic aqueous solution has been substantially or virtually freed from the free chlorine with reference to its detection limit. Step (1) is thus completed. The acidic aqueous mixture formed further contains the dissolved precious metal and still has a substantially unchanged low pH. It can further contain unreacted salt if it has been used in the above-mentioned superstoichiometric amount. In any case, it contains an oxidized reaction product of the salt used as a result of its chlorination.

Completion of step (1) of the method according to the invention is followed by step (2), the addition of non-precious metal to the acidic aqueous mixture formed in step (1) to precipitate elemental precious metal.

Examples of non-precious metals usable in step (2) include zinc and in particular iron. Both non-precious metals can be used in combination. Preferably, the non-precious metal is added in powder form. Iron powder is particularly preferably used.

The non-precious metal is added in a superstoichiometric amount in relation to precious metal present in dissolved form and to be precipitated in elemental form; for example, up to 1000 times the amount of the stoichiometric amount of non-precious metal is used. Even so, there is enough acid or hydrochloric acid in the acidic aqueous mixture to dissolve excess non-precious metal.

The dissolved precious metal present in the acidic aqueous mixture is reduced to the metallic precious metal and precipitates as precipitate and can be separated out, for example by filtration. It is preferred to wait with the separation until the non-precious metal has been completely dissolved. It is assumed that the hydrogen formed by the reaction of the non-precious metal with the acid, in particular the hydrogen formed in statu nascendi, acts as a reducing agent. The aqueous medium, obtained after the precipitated elemental precious metal has been separated out, in the form of an acidic (pH generally in the range of −0.5 to +3) aqueous solution containing dissolved non-precious metal, is characterized by an only small fraction of dissolved precious metal in the range of <5 mg/l, in particular 1-2 mg/l, and can be supplied to a customary wastewater treatment with neutralization, non-precious metal precipitation, ion exchange etc.

The method according to the invention is characterized by multiple advantages compared with the method outlined at the outset for recovering precious metal from an acidic aqueous solution containing dissolved precious metal and free chlorine, in which the free chlorine is expelled by means of aeration using compressed air. In particular, the advantages are:

1. The risk of an explosive mixture of hydrogen and chlorine gas forming after addition of the non-precious metal can be ruled out.
2. Free chlorine does not have to be expelled by means of aeration using compressed air.
3. The energy consumption and thus the costs of producing compressed air for aeration using compressed air no longer apply.
4. The necessary duration of the aeration using compressed air of typically 4 to 48 hours no longer applies, and the removal of the free chlorine is achieved within 5 to 15 minutes, with the advantages of a shorter production plant occupation duration per batch and lower precious metal bonding.
5. An exhaust air treatment for the removal of chlorine gas is not necessary; neither appropriately dimensioned plants nor scrubbing liquid for chlorine-containing exhaust air are required. There is no spent scrubbing liquid to be disposed of or processed.
6. Occupational safety problems or outlay associated with free chlorine in breathing air are avoided.

EXEMPLARY EMBODIMENT 1000 ml of a hydrochloric (pH=0.3) mother liquor, obtained after precious metal salt precipitation and containing free chlorine, having a residual precious metal concentration of 17 ppm by weight of Au(III), 18 ppm by weight of Pd(IV), 62 ppm by weight of Rh(III) and 44 ppm by weight of Ru(IV), were mixed in portions at 40° C. with 7.50 g (0.027 mol) of $Fe(II)SO_4 \times 7H_2O$, which is the equimolar amount in relation to the free chlorine. The redox potential of 1021 mV dropped to 503 mV within 5 minutes, corresponding to a virtually complete consumption of the free chlorine. The amount of $Fe(II)SO_4 \times 7H_2O$ added corresponded to 0.96 g of dissolved free chlorine. After a subsequent stirring time of 15 minutes, the precious metal still present in dissolved form in the hydrochloric mother liquor was reduced by adding 30 g of iron powder in portions at 40° C. within 2 hours. Excess iron powder dissolved completely in the hydrochloric medium. The precious metal precipitate formed was separated out by means of filtration via a filter. The precious metal concentration of the filtrate obtained was: Au<5 ppm by weight; Pd<5 ppm by weight; Rh<5 ppm by weight; Ru=6 ppm by weight. The filtrate was fed to a wastewater post-treatment process before introduction into the sewage system.

The invention claimed is:

1. A method for recovering precious metal from an acidic aqueous solution containing dissolved precious metal and free chlorine, the method comprising the following successive steps:
   (1) providing an acidic aqueous solution containing precious metal and free chlorine;
   (2) combining a salt of a non-precious metal present in a low oxidation state as a solid or as an aqueous solution with the acidic aqueous solution to completely or substantially completely consume the free chlorine and form an acidic aqueous mixture, and (3) adding non-precious metal to the acidic aqueous mixture formed in step (2) to precipitate elementary precious metal, wherein the acidic aqueous solution is characterized by (i) a fraction of dissolved precious metal in the range of 100 to 500 mg/l, (ii) a pH in the range of −0.8 to +1 and (iii) a content of the free chlorine in the range of 0.1 to 1 g/l, and the dissolved precious metal comprises at least one precious metal selected from the group consisting of gold, platinum, palladium, rhodium, iridium, osmium and ruthenium.

2. The method according to claim 1, wherein the acidic aqueous solution is a mother liquor originating from wet chemical precious metal recycling or wet chemical precious metal refining.

3. The method according to claim 1, wherein the acidic aqueous solution further comprises hydrochloric acid.

4. The method according to claim 1, wherein the salt used in step (2) comprises one or more salts selected from tin (II) salts, iron (II) salts, and combinations thereof.

5. The method according to claim 1, wherein the salt used in step (2) is used in a stoichiometric or superstoichiometric amount in relation to free chlorine to be consumed.

6. The method according to claim 1, wherein the non-precious metal used in step (3) is selected from zinc, iron and combinations of zinc and iron.

7. The method according to claim 1, wherein the non-precious metal used in step (3) is added in a superstoichiometric amount in relation to precious metal present in dissolved form and to be precipitated in elemental form.

8. The method according to claim 6, wherein the non-precious metal used in step (3) is in the form of a powder.

9. A method for recovering precious metal from an acidic aqueous solution containing dissolved precious metal and free chlorine, the method comprising the following successive steps:

(1) providing an acidic aqueous solution containing precious metal and free chlorine;

(2) combining a salt of a non-precious metal present in a low oxidation state as a solid or as an aqueous solution with the acidic aqueous solution to completely or substantially completely consume the free chlorine and form an acidic aqueous mixture, and (3) adding non-precious metal to the acidic aqueous mixture formed in step (2) to precipitate elementary precious metal, wherein the acidic aqueous solution is characterized by (i) a fraction of dissolved precious metal in the range of 100 to 500 mg/l, (ii) a pH in the range of −0.8 to +1 and (iii) a content of free chlorine in the range of 1000 to 10,000 ppm by weight, and the dissolved precious metal comprises at least one precious metal selected from the group consisting of gold, platinum, palladium, rhodium, iridium, osmium and ruthenium.

10. The method according to claim 9, wherein the acidic aqueous solution is a mother liquor originating from wet chemical precious metal recycling or wet chemical precious metal refining.

11. The method according to claim 9, wherein the pH of the acidic aqueous solution is in the range of −0.8 to less than −0.5.

12. The method according to claim 9, wherein the acidic aqueous solution further comprises hydrochloric acid.

13. The method according to claim 9, wherein the salt used in step (2) comprises one or more salts selected from tin (II) salts, iron (II) salts, and combinations thereof.

14. The method according to claim 9, wherein the salt used in step (2) is used in a stoichiometric or superstoichiometric amount in relation to free chlorine to be consumed.

15. The method according to claim 9, wherein the non-precious metal used in step (3) is selected from zinc, iron and combinations of zinc and iron.

16. The method according to claim 15, wherein the non-precious metal used in step (3) is in the form of a powder.

17. The method according to claim 9, wherein the non-precious metal used in step (3) is added in a superstoichiometric amount in relation to precious metal present in dissolved form and to be precipitated in elemental form.

\* \* \* \* \*